W. FARNSWORTH.
SAFETY APPLIANCE FOR LIFTS.
APPLICATION FILED NOV. 9, 1907.

907,021.

Patented Dec. 15, 1908.
3 SHEETS—SHEET 1.

W. FARNSWORTH.
SAFETY APPLIANCE FOR LIFTS.
APPLICATION FILED NOV. 9, 1907.

907,021.

Patented Dec. 15, 1908.

3 SHEETS—SHEET 2.

Witnesses:
Geo. B. Pitts,
N. E. Costello

Inventor:
William Farnsworth,
By J. S. Barker
Atty.

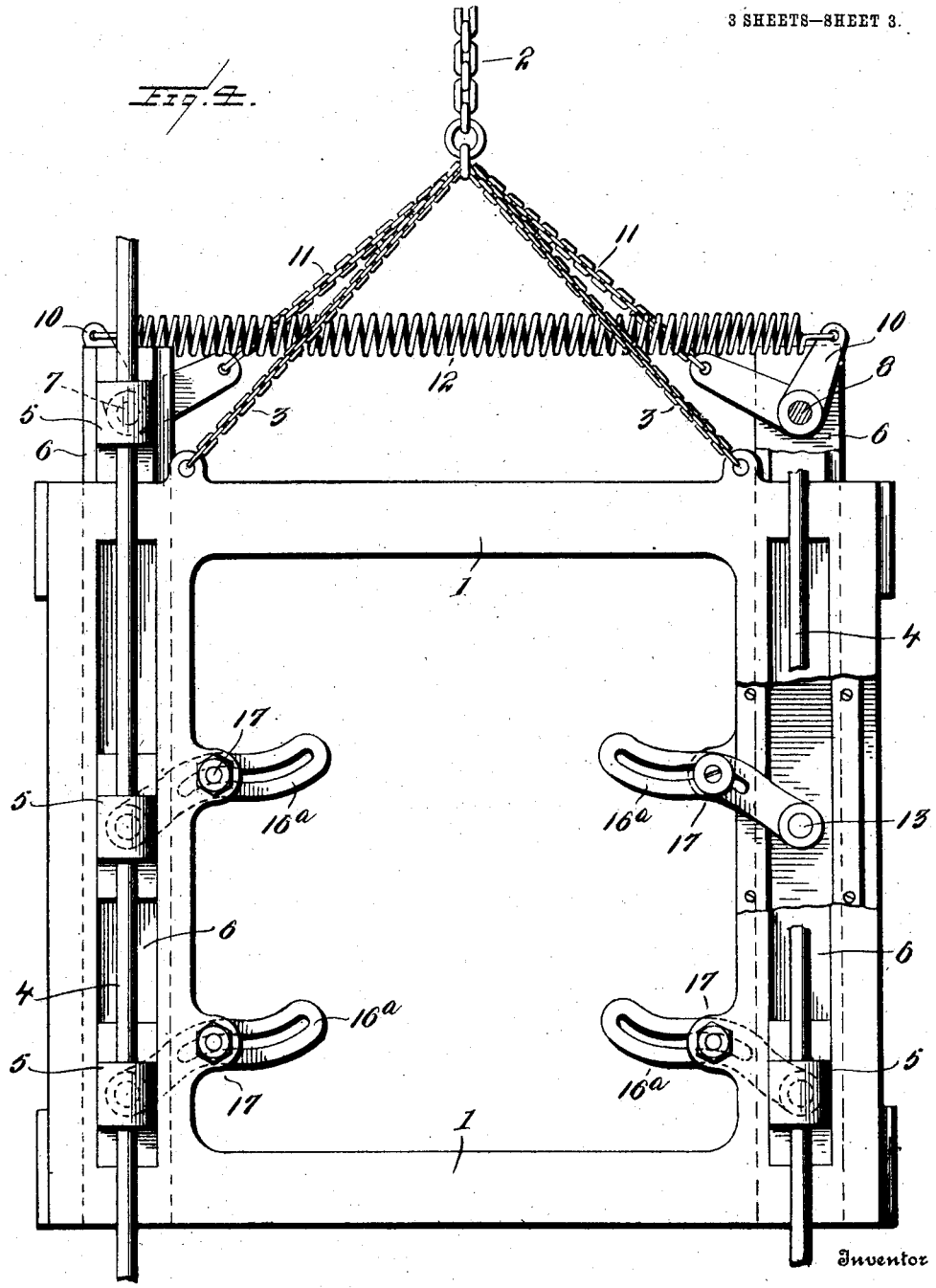

UNITED STATES PATENT OFFICE.

WILLIAM FARNSWORTH, OF NOTTINGHAM, ENGLAND.

SAFETY APPLIANCE FOR LIFTS.

No. 907,021.  Specification of Letters Patent.  Patented Dec. 15, 1908.

Application filed November 9, 1907. Serial No. 401,435.

*To all whom it may concern:*

Be it known that I, WILLIAM FARNSWORTH, a subject of the King of Great Britain, and resident of the city of Nottingham, in the county of the said city, England, have invented new and useful Improvements in Safety Appliances for Lifts, of which the following is a specification.

This invention relates to an improved safety appliance applicable to cages for mines, lifts, elevators and the like in which the cage is guided by ropes, and has particular reference to that class of safety appliances which come into action when the hauling rope breaks and stops the descent of the cage by coupling it to the guide ropes, the object of the present invention being the construction of a safety appliance in which the weight of the cage is used to actuate the mechanism by which the cage is coupled to the guide rope.

Figure 1:
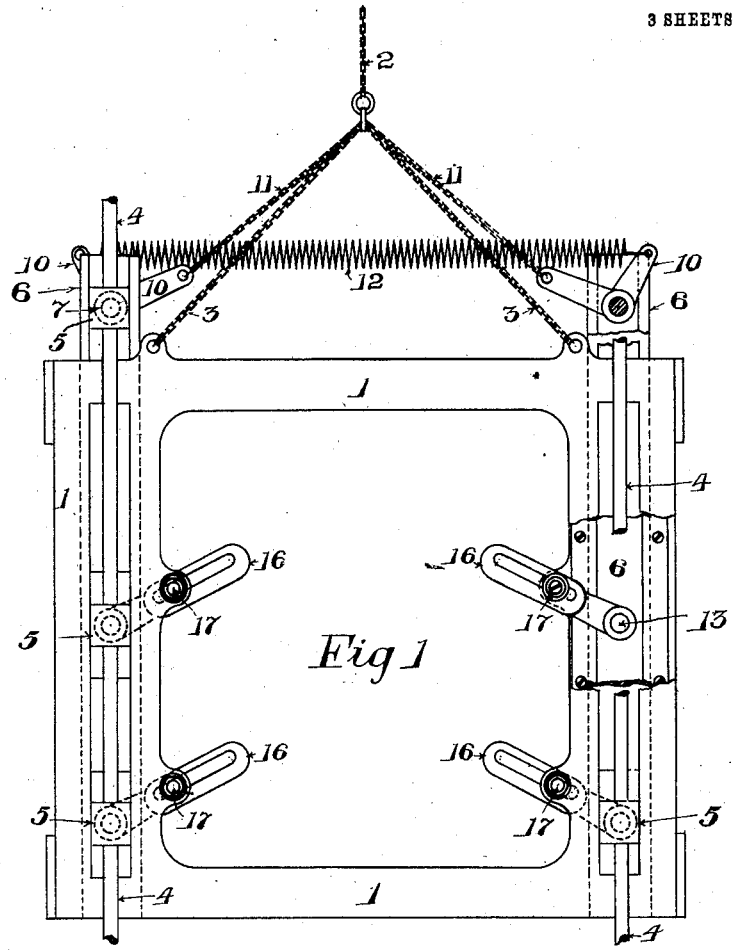
Figure 2:
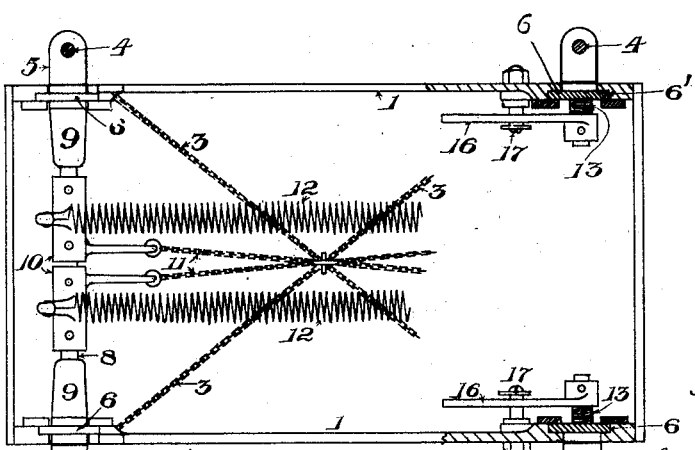
Figure 3:
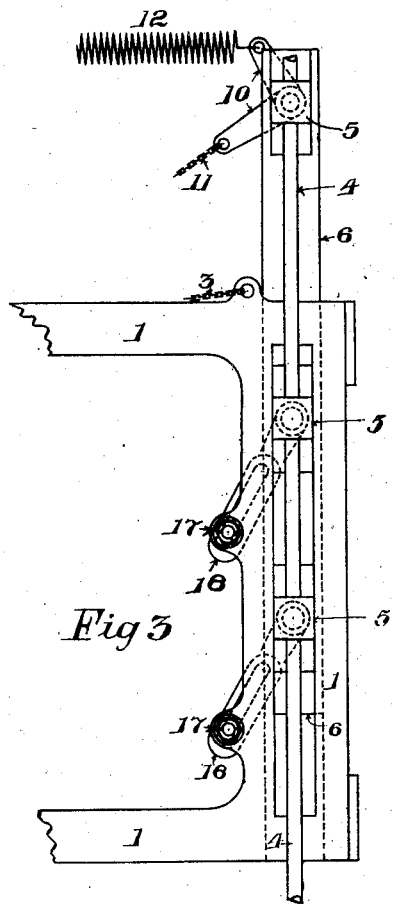
Figure 7:
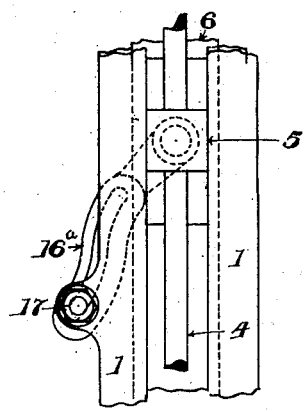
Figure 5:
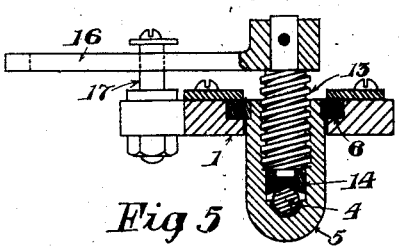
Figure 6:
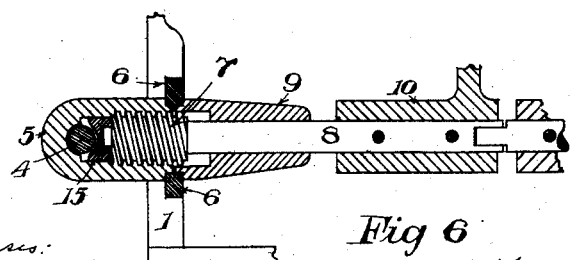

In the accompanying drawings which show the application of this invention to a pit cage Figure 1 is a side elevation of a cage showing the application of the improved safety mechanism. Fig. 2 is a plan of the same, part of which is shown in section. Fig. 3 is an elevation of the mechanism at one end of the cage showing the position of the parts occupied when the cage has been coupled to the guide ropes. Fig. 4 is an elevation of a cage showing another form of gripping lever. Fig. 5 is a section, to an enlarged scale, of a cage gripping screw and connected parts, and Fig. 6 is a section, to an enlarged scale, of a slide gripping screw and connected parts. Fig. 7 is a fragmentary view of the elevator illustrated in Fig. 4 showing the position the parts occupy when the cage has been coupled to the guide ropes.

In the arrangement shown in the drawings the cage is represented by the frame 1 and it is connected to the hauling rope 2 by "bull" or coupling chains 3. The guide ropes 4, one at each corner of the cage, are carried from the top of the shaft by any of the usual means and they pass through guide eyes in brackets 5. These brackets are attached to bars 6 which are fitted to slide vertically in or upon guides 6' formed in, or attached to the cage, the particular arrangement of the guides being constructed according to the requirements of the cage. The brackets 5 at the upper ends of the bars 6 are fitted with screws 7 by which the bars can be fastened to the guide ropes, and on the inner side of the bars 6 the screw spindles 8 are supported by bearings 9 and have mounted thereon double armed levers 10, while the extreme ends of the spindles 8 at one side of the cage have bearings in the ends of the spindles at the other side of the cage.

One arm of each of the levers 10 is connected by a chain 11 to the hauling rope 2 while the other arm of the levers 10 at one end of the cage is connected to the corresponding arm of the levers 10 at the opposite end of cage by springs 12, and while the hauling rope remains intact the parts occupy the position shown in Fig. 1 during the ascent and descent of the cage, the ends of the screws being held clear of the guide ropes. The lower brackets 5, of which there may be one or more on each slide bar are fitted with screws 13 by which the cage can be coupled to the guide ropes. The inside faces of all the brackets 5 have a boss which is turned to fit a hole in the side bars 6 and the brackets have tapped holes to form nuts for the screws 7 and 13, while the ends of the screws act upon the guide ropes through keys 14 and 15 as shown in detail in Figs. 5 and 6, the screws being right or left handed according to their position on the cage. The screws 13 are fitted with levers 16 which have a straight slot as shown in Fig. 1 or levers 16$^a$ each provided with a cam shaped slot as shown in Fig. 4 and when the cam shaped slots are used such slots may be designed to accelerate or retard the gripping action of the screws relatively to the angular movement of the levers. These levers engage with studs 17 carried by the cage and any movement of the cage relatively to the slide bars gives motion to the screws 13.

The drawing Fig. 1 represents the parts in their normal positions, the hauling rope being intact and all the screws clear of the guide ropes. If however from any cause the hauling rope should break the levers 10 are left free to move under the action of the springs 12, and these springs actuate the screws 7 and fasten the slide bars 6 to the guide ropes 4. The cage is then free to fall independently of the slide bars 6 and in so falling gives motion to the screws 13 through the levers 16 until the grip of the screws on the ropes is sufficiently strong to arrest the further descent of the cage and this action is due to the weight of the cage acting on the levers 16 and when the cage is brought to rest its weight is supported by the screws 13 through the levers 16 and studs 17. When cam shaped levers are used they are preferably shaped to so actuate the screws that they are first rotated to produce a frictional braking grip before the holding grip and thereby cause the cage to come to rest more gradually and steadily.

What I claim is:

1. The combination of a cage and guide ropes with one or more sliding bars, screw mechanisms for coupling the bars and guide ropes, and screw mechanisms for coupling the cage to the guide ropes as herein set forth.

2. The combination with a cage, a hoisting rope and guides, of a slidable bar mounted on the cage, means for gripping the bar to one of the guides and causing movement of the bar relative to the cage upon the breaking of the hoisting rope, a bracket provided with an eye for the guide and with a tapped hole secured to the said bar, and screw-operated mechanism working in the tapped hole of the bracket for gripping the said guide.

3. The combination of a cage and guide ropes with sliding bars, mechanisms for connecting said bars to the guide ropes, screws for connecting the cage to the guide ropes, slotted levers connected with the said screws and studs on the cage for coacting with the slotted levers as herein set forth.

4. The combination of a cage and guide ropes with sliding bars, screw mechanisms for connecting such bars to the guide ropes, screws for connecting the cage to the guide ropes, cam shaped slotted levers on such screws, and studs on the cage for coacting with the slotted levers as herein set forth.

5. The combination of a cage and guide ropes with a sliding bar to each guide rope, a screw for connecting the bar and guide rope, an actuating lever on the screw, a connecting chain between the lever and the hauling rope, a spring connected to the said lever, and screw mechanism for connecting the cage and guide rope as herein set forth.

6. The combination with a cage and guide ropes therefor, of sliding bars carried by the cage, means carried by the said sliding bars for engaging with the guide ropes when the hauling rope breaks, a screw mechanism carried by each sliding bar for engaging the guide ropes, and means for operating the said screw mechanism whenever there is relative movement between the cage and the sliding bars, substantially as set forth.

WILLIAM FARNSWORTH.

Witnesses:
WILLIAM H. POTTER,
JOHN ARCHER.